US012033460B2

(12) United States Patent
Edsall

(10) Patent No.: US 12,033,460 B2
(45) Date of Patent: Jul. 9, 2024

(54) BEHAVIORAL MOBILE OFFER TARGETING

(71) Applicant: IGT, Las Vegas, NV (US)

(72) Inventor: Ethan Edsall, Sparks, NV (US)

(73) Assignee: IGT, Las Vegas, NV (US)

( * ) Notice: Subject to any disclaimer, the term of this patent is extended or adjusted under 35 U.S.C. 154(b) by 89 days.

(21) Appl. No.: 17/214,127

(22) Filed: Mar. 26, 2021

(65) Prior Publication Data

US 2022/0309860 A1 Sep. 29, 2022

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.
CPC ........ *G07F 17/323* (2013.01); *G07F 17/3239* (2013.01)

(58) Field of Classification Search
CPC ............................. G07F 17/32; G07F 17/3213
USPC ..................................... 463/1, 20, 22, 25, 39
See application file for complete search history.

(56) References Cited

U.S. PATENT DOCUMENTS 9,344,842 B2 5/2016 Huston
9,396,471 B1 7/2016 Kerr
2007/0072678 A1* 3/2007 Dagres .................... G07F 17/32 463/42
2010/0125510 A1 5/2010 Smith et al.
2013/0073336 A1* 3/2013 Heath .................... G06Q 30/02 705/7.29
2013/0274007 A1* 10/2013 Hilbert .................... A63F 13/00 463/29
2013/0346396 A1* 12/2013 Stamm ................ G06F 16/9535 707/722
2018/0374267 A1 12/2018 Yurkin

FOREIGN PATENT DOCUMENTS

JP 2012-508928 A 4/2012

* cited by examiner

*Primary Examiner* — Adetokunbo O Torimiro
(74) *Attorney, Agent, or Firm* — Sage Patent Group

(57) ABSTRACT

Provided is a server that includes a processor circuit and a memory coupled to the processor circuit. The memory includes computer program instructions that, when executed by the processor circuit, cause the server to perform operations including receiving user interest data that includes data corresponding to user-specific interests of a user. Operations may include comparing the user interest data to a gaming opportunity that is provided by a gaming operator that operates gaming devices. Operations may include responsive to determining that the user interest data corresponds to the gaming opportunity, causing a targeted offer message that corresponds to the gaming opportunity to be sent to the user.

17 Claims, 5 Drawing Sheets

BEHAVIORAL MOBILE OFFER TARGETING

BACKGORUND OF THE DISCLOSURE

Embodiments described herein relate to systems, methods and computer program products for providing targeted offers to mobile devices.

In wagering gaming environments, customers may have specific preferences regarding casino offerings, games and/or features. Currently, player tracking systems may rely on data gathered from wagering activity and other activity that is performed by a user at a casino or other gaming establishment. However, such data may not include information that may provide a more comprehensive definition of casino offerings that may be interesting to the user. As such, it may be difficult to identify which offerings that the user may be interested in.

BRIEF SUMMARY OF THE DISCLOSURE

Some embodiments of the inventive concept are directed to a gaming system that includes a processor circuit and a memory coupled to the processor circuit. The memory includes machine-readable instructions that, when executed by the processor circuit, cause the processor circuit to perform operations of receiving user interest data that includes data corresponding to user-specific interests of a user, comparing the user interest data to a gaming opportunity that is provided by a gaming operator that operates gaming devices, and responsive to determining that the user interest data corresponds to the gaming opportunity, causing a targeted offer message that corresponds to the gaming opportunity to be sent to the user.

Some embodiments are directed to methods that include operations of receiving, into a data repository corresponding to a mobile device of a user, input data that is received via multiple non-gaming software applications operating on the mobile device. Operations include storing elements of the input data as identifiers corresponding to user interests and sending, to a gaming operator device, user interest data corresponding to the elements of the input data. Operations may include receiving a targeted offer message that corresponds to a gaming opportunity that relates to the user interest data.

Some embodiments are directed to a device that includes processor circuit and a memory coupled to the processor circuit. The memory includes computer program instructions that, when executed by the processor circuit, cause the server to perform operations including receiving, from a user, user inputs corresponding to multiple non-gaming software applications that operate on the device and that correspond to user-specific interests of the user. Operations include comparing the user interest data to a gaming opportunity that is provided by a gaming operator that operates gaming devices and responsive to determining that an element of the user interest data corresponds to the gaming opportunity, causing a targeted offer message that corresponds to the gaming opportunity to be sent to the user.

DETAILED DESCRIPTION OF THE DISCLOSURE

Figure 1:
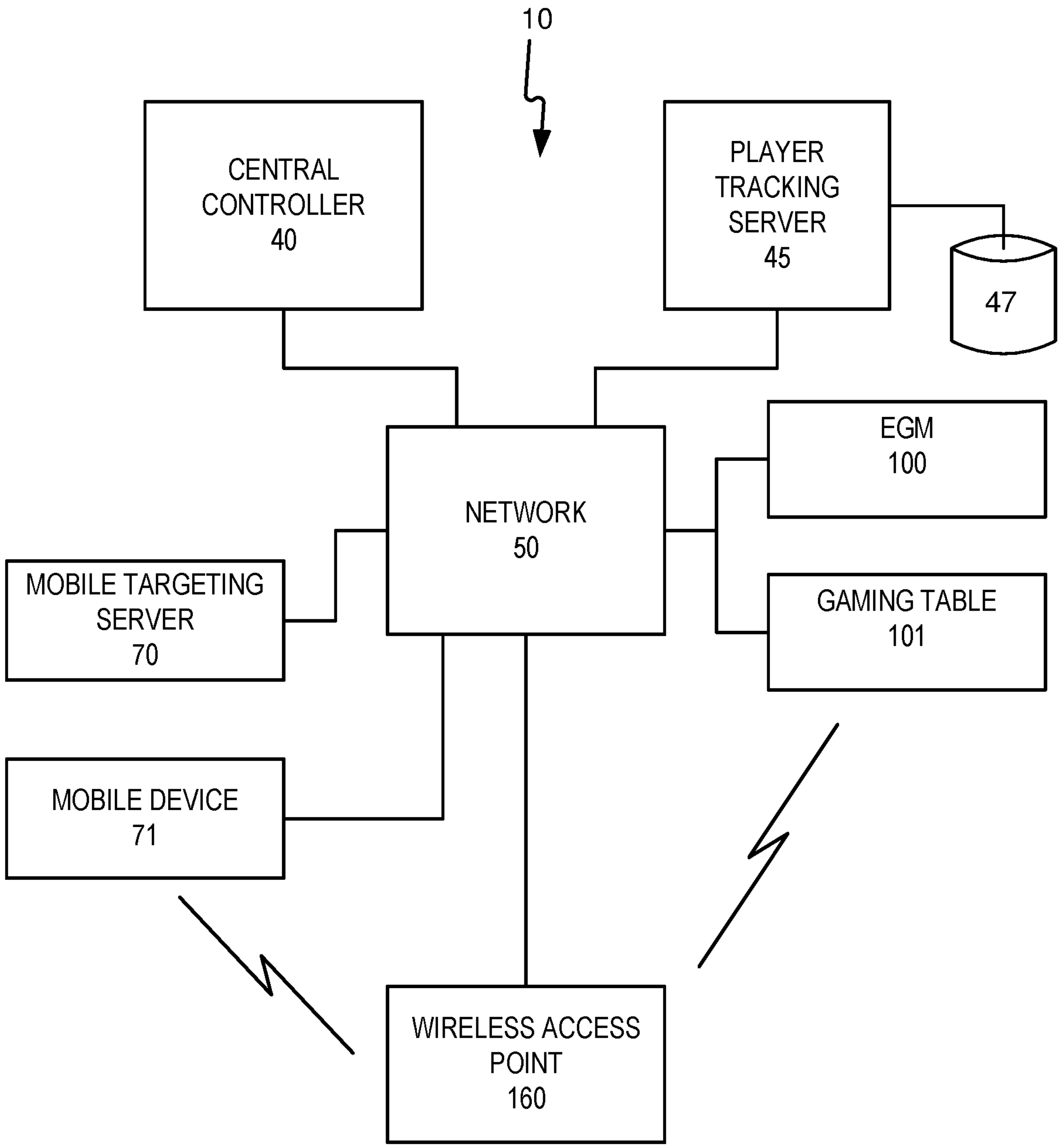
FIG. 1 is a schematic block diagram illustrating a network configuration for gaming devices according to some embodiments.

Embodiments of the inventive concepts provide systems and methods for presenting specific offers or wagering opportunities to a player based on data gathered from the player's mobile device. For example, data from a player's mobile device may include browsing behavior data. In some embodiments, a player's browsing history may be analyzed. Based on that analysis, information corresponding to the games, promotions, and/or amenities that are most relevant may be displayed and/or may be sent to the player's mobile device as an alert. By analyzing, for example, browsing history of the player, which may relate to a variety of topics, including non-gaming topics, casino operators may gain the ability to get unique insight regarding their patrons' interests.

In some embodiments, a user profile may be generated that contains information based past browsing history such as time spent on site(s), last time of visit to site(s), and number of times site(s) were visited, etc. This profile data can be collected from a plurality of different sources including browser Cookies, Flash Cookies, Etags, and/or HTML5 local storage cache, among others. A mobile client application may read from this user profile data and/or compare that user profile data to casino game theme data to create matches. In some embodiments, the most appropriate match may then be presented to the user as a notification and/or an attract mode display for a relevant game theme that they may enjoy.

In some embodiments, a mobile app user may frequently enjoy watching a particular program, such as a specific TV show. The user may frequently visit a website discussing the specific TV show and/or watch the specific TV show from his mobile device. In some embodiments, the user may have recently purchased branded merchandise corresponding to the TV show. For example, the user may have purchased a branded coffee cup including the name of the TV show. Some embodiments provide that the next time the user logs into a casino brand related app, such as a previously installed mobile wallet app/MiO, a notification is shown that the casino is offering a new wagering game that is related to the specific TV show for the user to play.

In some embodiments, a local casino may have many (e.g., 10,000) players enrolled in their players club and the majority of these players may have downloaded an in-house casino branded application for an existing product offering such as MiO or Cardless/Cashless functionality. The app may collect information relating to music on phones, purchased concert tickets, purchased band apparel, etc. Based on this information, the casino may determine that some portion of the patrons have done these types of activities for certain entertainment types (e.g., classic rock bands), while only 500 of them have done similar activities for other entertainment type (e.g., country bands). Based on this data, the casino may have a better idea of which bands to book, which may increase patron satisfaction by providing entertainment they enjoy, and which may allow the operator to sell more tickets to the show.

In some embodiments, data could be collected from the browsing history of the user's mobile devices and sent back to the casino system continuously, on a periodic basis, on a one-time and/or case-by-case basis.

Referring to FIG. 1, a gaming system 10 including an EGM 100 is illustrated. The gaming system 10 may be located, for example, on the premises of a gaming establishment, such as a casino. The EGM 100, which may typically be situated on a casino floor, may be in communication with other EGMs 100 and/or at least one central controller 40 through a data network or remote communication link 50. The data communication network 50 may be a private data communication network that is operated, for example, by the gaming facility that operates the EGM 100.

The gaming system 10 may include a table game 101 that may typically be situated on a casino floor, may be in communication with EGMs 100, other table games 101 and/or at least one central controller 40 through a data network or remote communication link 50. Table games 101 may include conventional wagering table games that may be configured to track and store player activity during a gaming session and/or electronic table games (ETG) that include one or more processors and interact with the player via displays and/or user interfaces.

Communications over the data communication network 50 may be encrypted for security. The central controller 40 may be any suitable server or computing device which includes at least one processor and at least one memory or storage device. Each EGM 100 and/or table game 101 may include a processor that transmits and receives events, messages, commands or any other suitable data or signal between the EGM 100 and/or table game 101 and the central controller 40. The EGM processor or table game processor is operable to execute such communicated events, messages or commands in conjunction with the operation of the EGM 100 and/or table game 101. Moreover, the processor of the central controller 40 is configured to transmit and receive events, messages, commands or any other suitable data or signal between the central controller 40 and each of the individual EGMs 100 and/or table games 101. In some embodiments, one or more of the functions of the central controller 40 may be performed by one or more EGM and/or table game processors. Moreover, in some embodiments, one or more of the functions of one or more EGM processors and/or table game processors as disclosed herein may be performed by the central controller 40.

A wireless access point 160 provides wireless access to the data communication network 50, the mobile device 71 and/or other system components such as the gaming table 101, the EGM 100, the mobile targeting server 70 and/or the player tracking server 45, among others. The wireless access point 160 may be connected to the data communication network 50 as illustrated in FIG. 1 or may be connected directly to the central controller 40 or other servers connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

In some embodiments, the gaming system 10 includes a mobile targeting server 70. The mobile targeting server 70 may be a computing system that communicates through the data communication network 50 with a mobile device 71, the player tracking server 45, EGM 100, gaming table 101 and/or a vendor 72. The mobile device 71 may include one or more personal computing devices, such as laptop computers, tablet computers or computing devices, personal digital assistants (PDAs), mobile telephones such as smart phones, and other mobile computing devices.

In some embodiments, the mobile device 71 may communicate with the mobile targeting server 70 to transmit interest data from the mobile device 71 to the mobile targeting server 70. The interest data may include data corresponding to user-specific interests of the user. The mobile targeting server 70 may compare the interest data to gaming opportunities that may be provided by a gaming operator.

Based on the comparison, the mobile targeting server 70 may determine that the user interest data corresponds to a gaming opportunity. In response to that determination, the mobile targeting server 70 may cause a targeted offer message that corresponds to the gaming opportunity to be sent to the mobile device 71. In this manner, the user may be offered a gaming opportunity that corresponds to the specific interests of the user.

In some embodiments, the user interest data is received from the mobile device 71 that is associated with the user. The user interest data may be based on mobile device 71 usage corresponding to a software application that is unrelated to the gaming opportunity and that receives data from the user that indicates the user's interest.

In some embodiments, the user interest data is received from the user, via one or more software applications that are on the mobile device 71. In such embodiments, the software applications may receive the data that is used to determine the user interest data from the user. Some embodiments provide that the user interest data includes historical data that is received from the user via the software applications over a given period of time. For example, the historical data may be gathered and/or aggregated before the user interest data is received by the mobile targeting server 70 from the mobile device 71. In some embodiments, whether an item of the historical data includes the user interest data may be based on the quantity of times that the item of the historical data has been received during the given period of time. For example, an item of historical data may be identified as user interest data if that item of historical data has been received in greater quantities and/or with greater frequency than other data.

In some embodiments, the user interest data includes recently received data that is received from the user by the mobile device 71. For example, the recently received data may indicate an increased interest by the user based on the recency corresponding to the recently received data.

In some embodiments, receiving the user interest data includes causing a request for user interest data to be sent from the mobile targeting server 70 to the mobile device 71 and receiving the user interest data into the mobile targeting server 70 responsive to the mobile device 71 receiving the request. In some embodiments, the user interest data may include updated user interest data. For example, previously received user interest data may be updated with user interest data that is more recent. In some embodiments, updating the user interest data may include replacing older, less relevant data with more recent data. In some embodiments, updating the user interest data may include aggregating recently received user interest data with previously received user interest data.

Some embodiments include determining that the user is at a location corresponding to the gaming operator. In some embodiments, determining that the user is at a particular location may include detecting the presence of the mobile device using one or more wired technologies and/or wireless technologies and/or detecting the presence of the user using one or more tracking and/or image processing technologies. In response to determining that the user is at the gaming operator location, the mobile targeting server 70 may cause a request to be sent to the mobile device 71 for the mobile device 71 to send updated user interest data in real time or near real time.

Some embodiments include determining that the user is at a location other than a location corresponding to the gaming operator. In some embodiments, such determination may be made by receiving a message from the mobile device 71 that includes information regarding the location of the mobile device 71. For example, an application on a mobile device 71 may be operable to send a message to the mobile targeting server 70 or other connected device that indicates that the user has just arrived in a city that includes a location corresponding to the operator. Similarly, an application on a mobile device 71 may be operable to send a message to the mobile targeting server 70 or other connected device that indicates that the user is walking or is in a vehicle that is near a location corresponding to the operator. In some embodiments, a message may be sent to the mobile device 71 inviting the user to go to the location corresponding to the gaming operator.

In response to determining that the user is not at the gaming operator location, the mobile targeting server 70 may cause requests to be sent to the mobile device 71 for the mobile device to periodically send updated user interest data that corresponds to a time interval.

In some embodiments, the user interest data includes a key word list that includes weighting of the key words based on usage by the user. For example, some keywords may indicate greater interest in some topics or features relative to other topics or features. Key words corresponding to greater interest may include key word weighting values that are higher than those of less interest.

Some embodiments provide that the gaming opportunity includes an electronic gaming machine (EGM) that includes content that corresponds to a portion of the user interest data. In such embodiments, the targeted offer message may invite the user to play that EGM. In some embodiments, the targeted offer message includes an offer to provide game incentives to the user. The game incentives may correspond to the EGM.

Some embodiments provide that the gaming opportunity includes an entertainment experience at a casino operated by the gaming operator. In some embodiments, the targeted offer message may include an offer to provide a discount corresponding to the entertainment experience.

Some embodiments provide that the gaming opportunity includes an electronic gaming machine (EGM) that includes content that corresponds to a portion of the user interest data. In some embodiments, the targeted offer message includes a video graphic that corresponds to an attract mode of the EGM.

Some embodiments include aggregating the user interest data that corresponds to a multiple different users to generate aggregate user interest data. In some embodiments, the aggregate user interest data may be provided to the gaming operator for future gaming opportunities identification. For example, an operator receiving the aggregate user interest data may be able to offer gaming opportunities that reflect current interests and/or trends among users.

Figure 2:
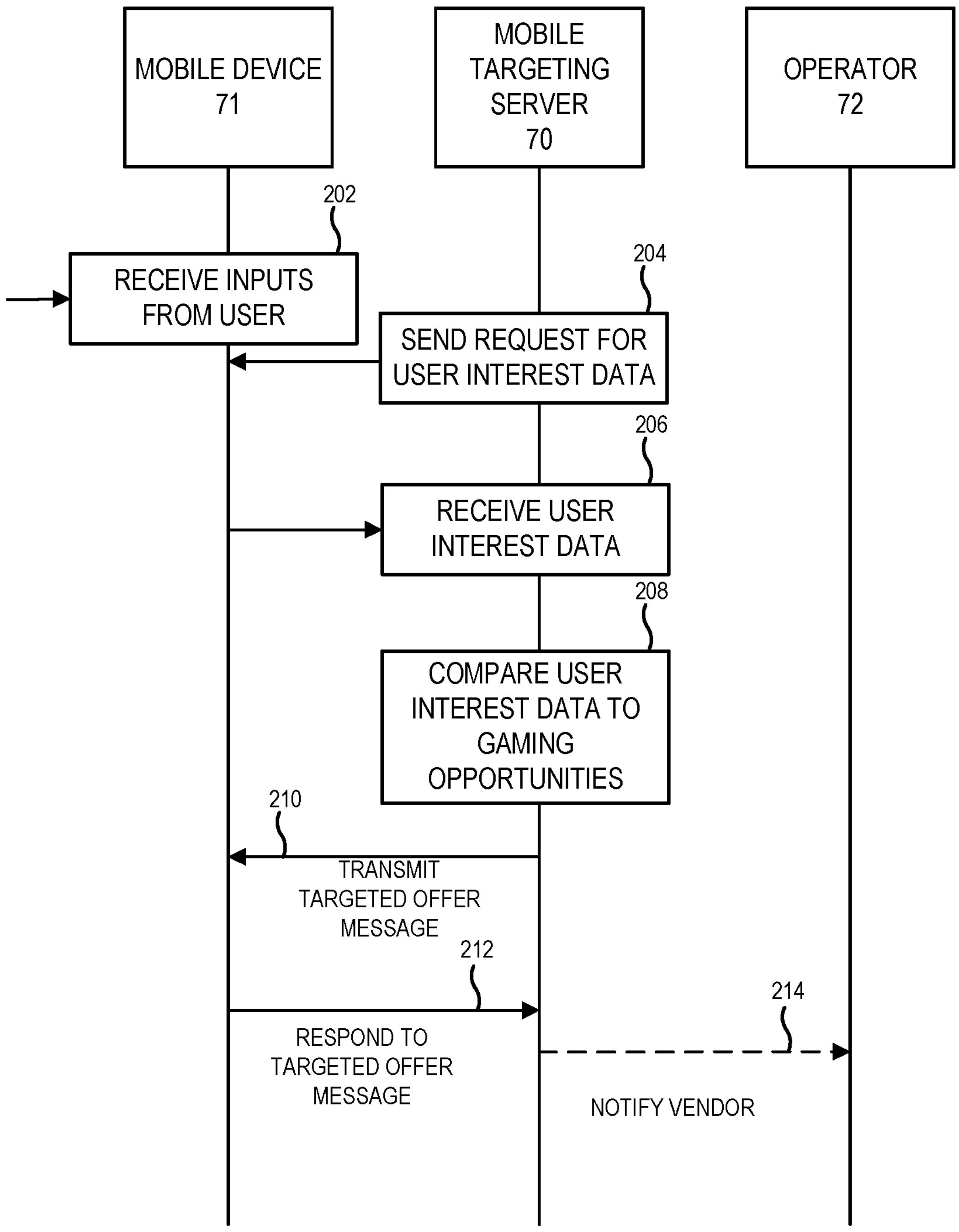
FIG. 2 is a flow diagram illustrating data flows according to some embodiments.

Reference is now made to FIG. 2, which is a flow diagram illustrating data flows according to some embodiments. Inputs may be received (block 202) from a user into a mobile device 71. The inputs may correspond to many different interests of the user. In some embodiments, such inputs may be received via one or more applications that the user is using on the mobile device 71.

A mobile targeting server 70 may send (block 204) a request to the mobile device 71 for user interest data that may be generated from the inputs received from the user. In response to the request, the mobile targeting server 70 may receive (block 206) the user interest data from the mobile device 71.

The mobile targeting server 70 may compare (block 208) the interest data that was received from the mobile device 71 to gaming opportunities that may be available. Based on the outcome of the comparison, the mobile targeting server 70 may transmit 210 a targeted offer message to the mobile device 71. In this manner, the operator of the gaming opportunities may provide the user with available gaming opportunities that are relevant to the user's interests.

In some embodiments, the mobile targeting server 70 may receive 212 a response to the targeted offer message from the user via the mobile device 71. In some embodiments, the mobile targeting server may send or cause to be sent a notification message 214 to the operator 72.

In some embodiments, the gaming opportunities may include non-gaming events or activities such as complimentary or discounted meals or entertainment events or activities.

Figure 3:
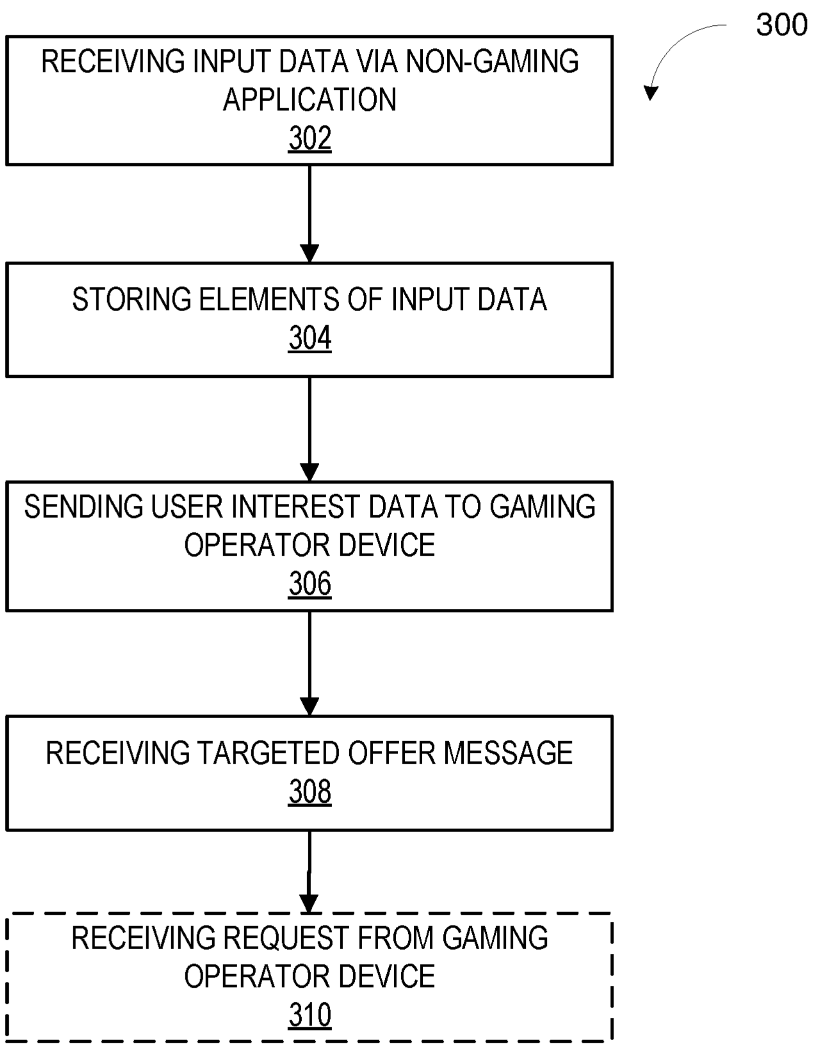
FIGS. 3-4 are flowcharts illustrating operations of systems/methods according to some embodiments.

Reference is now made to FIG. 3, which is a flowchart illustrating operations of systems/methods according to some embodiments. Operations may include receiving (block 302) input data into a data repository corresponding to a mobile device of a user. The input data may be received via multiple non-gaming software applications operating on the mobile device. For example, applications may include applications directed to specific interests, such as entertainment types (e.g., sports, wagering, broadcast media, movies, performers, and/or music, among others).

Operations include storing (block 304) elements of the input data as identifiers corresponding to user interests and sending (block 306), to a gaming operator device, user interest data corresponding to the elements of the input data. Operations further include receiving (block 308) a targeted offer message that corresponds to a gaming opportunity that relates to the user interest data.

In some embodiments, the gaming opportunity includes an electronic gaming machine (EGM) that includes content that corresponds to a portion of the user interest data. Some embodiments provide that the targeted offer message includes a video graphic that corresponds to an attract mode of the EGM.

In some embodiments, the gaming opportunity includes an entertainment experience at a casino that is operated by the gaming operator. For example, the targeted offer message may include an offer to provide a discount corresponding to the entertainment experience.

Some embodiments include receiving (block 310) a request for the user interest data from a gaming operator device. In such embodiments, sending the user interest data to the gaming operator device may be performed responsive to receiving the request.

Figure 4:
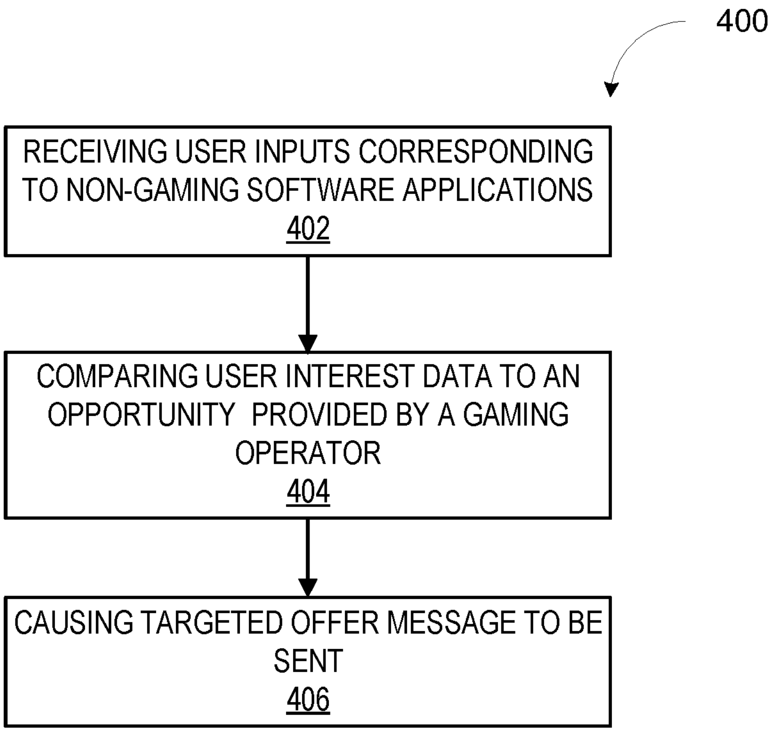

Reference is now made to FIG. 4, which is a flowchart illustrating operations of systems/methods according to some embodiments. Operations may include receiving (block 402) user inputs corresponding to non-gaming software applications that are operating on a device. In some embodiments, the user inputs correspond to user-specific interests of the user. In some embodiments, the non-gaming software applications may include applications that are specific to entertainment media, social networking, political interests, sports, and/or technology, among others.

Operations further include comparing (block 404) the user interest data to an opportunity that is provided by a gaming operator that operates multiple gaming devices. In some embodiments, the opportunity includes an opportunity related to a particular gaming device that corresponds to the user-specific interests. In some embodiments, the opportunity may correspond to an event and/or activity that corresponds to the user-specific interests but is not a gaming device.

In some embodiments, the user interest data may include multiple elements and/or types thereof. In response to determining that an element of the user interest data corresponds to the opportunity, operations may include causing (406) a targeted offer message that corresponds to the opportunity to be sent to the user.

In some embodiments, the opportunity is a gaming opportunity that corresponds to an electronic gaming machine (EGM) that includes content that corresponds to the element of the user interest data. In some embodiments, the targeted offer message includes an offer to provide game incentives to the user that correspond to the EGM. For example, the targeted offer message may include an offer to provide the user free bonus games or other awards.

Figure 5:
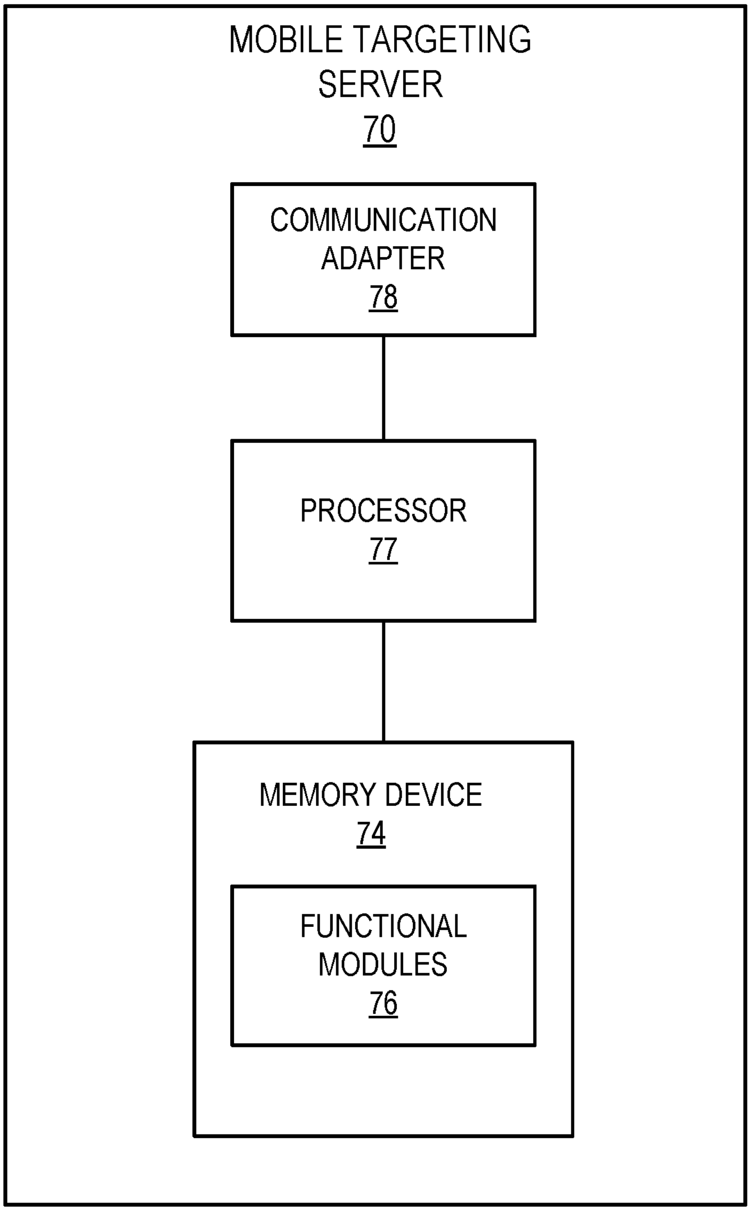
FIG. 5 is a schematic block diagram illustrating an electronic configuration for a mobile targeting server according to some embodiments.

Reference is now made to FIG. 5, which is a block diagram that illustrates various components of a mobile targeting server 70 according to some embodiments. As shown in FIG. 5, the mobile targeting server 70 may include a processor 77 that controls operations of the mobile targeting server 70. Although illustrated as a single processor, multiple special purpose and/or general purpose processors and/or processor cores may be provided in the mobile targeting server 70. For example, the mobile targeting server 70 may include one or more of a video processor, a signal processor, a sound processor and/or a communication controller that performs one or more control functions within the mobile targeting server 70. The processor 77 may be variously referred to as a "controller," "microcontroller," "microprocessor" or simply a "computer." The processor may further include one or more application-specific integrated circuits (ASICs).

Various components of the mobile targeting server 70 are illustrated in FIG. 5 as being connected to the processor 77. It will be appreciated that the components may be connected to the processor 77 through a system bus, a communication bus and controller, such as a USB controller and USB bus, a network interface, or any other suitable type of connection.

The mobile targeting server 70 further includes a memory device 74 that stores one or more functional modules 76 for performing the operations described above.

The memory device 74 may store program code and instructions, executable by the processor 77, to control the mobile targeting server 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The mobile targeting server 70 may include a communication adapter 78 that enables the mobile targeting server 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The mobile targeting server 70 may include one or more internal or external communication ports that enable the processor 77 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 77.

Although illustrated and discussed as a separate device, some embodiments provide that the mobile targeting server 70 and some or all of the components therein may be implemented in the central controller 40 (FIG. 1) and/or the player tracking server 45 (FIG. 1).

In various embodiments, the gaming system includes one or more player tracking systems under control of the player tracking server 45 (FIG. 1). Some embodiments provide that such tracking systems may be used to provide location related data to the mobile device 71 and/or the mobile targeting server 71. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. Some embodiments provide that such information and/or data may be used in combination with the user interest data that may be received from the mobile device 71. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

As noted above, a player's progress or status can be saved in other ways besides using a player tracking system, such as by generating, when the player cashes out, a ticket including a printed code, such as a bar code or QR code, that identifies the player's session. When the player wants to continue the game, the player may insert the ticket including the printed code into an EGM 100 (which may or may not be the same EGM 100 from which the ticket was issued). The EGM 100 reads the printed code and retrieves the player's status in response to the printed code.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the embodiments disclosed herein, and that modifications to the disclosed embodiments, as well as other embodiments, are intended to be included within the scope of the appended claims. The present inventive concept is defined by the following claims.

What is claimed is:

1. A server comprising:

a processor circuit; and a memory coupled to the processor circuit, wherein the memory comprises computer program instructions that, when executed by the processor circuit, cause the server to perform operations comprising:

receiving user interest data that comprises data corresponding to user-specific non-gaming interests of a user;

comparing the user interest data to a gaming opportunity that is provided by a gaming operator that operates a plurality of gaming devices; and responsive to determining that the user interest data corresponds to the gaming opportunity, causing a targeted offer message that corresponds to the gaming opportunity to be sent to the user, wherein the gaming opportunity comprises an electronic gaming machine (EGM) that comprises content that corresponds to a portion of the user interest data, wherein the user interest data is based on mobile device usage corresponding to a software application that is unrelated to the gaming opportunity, that is used on the mobile device, and that receives data from the user that indicates the user's interest, wherein the software application comprises entertainment media, and wherein the receiving user interest data comprises:

causing a request for user interest data to be sent to the mobile device;

receiving the user interest data responsive to the mobile device receiving the request, and wherein the user interest data comprises updated user interest data.

2. The server of claim 1, wherein receiving the user interest data comprises receiving the user interest data from a mobile device that is associated with the user.

3. The server of claim 1, wherein the user interest data that is received, from the user, by a plurality of software applications that are on a mobile device that is associated with the user and that receive data from the user that is used to determine the user interest data.

4. The server of claim 3, wherein the user interest data comprises historical data that is received from the user by the plurality of software applications over a given period of time before the user interest data is received from the mobile device, and wherein whether an item of the historical data comprises the user interest data is based on a quantity of times that the item of the historical data is received during the given period of time.

5. The server of claim 3, wherein the user interest data comprises recently received data that is received from the user by the mobile device, wherein the recently received data comprises an indication of a recent interest by the user corresponding to the recently received data.

6. The server of claim 1, further comprising:

determining that the user is at a location corresponding to the gaming operator; and causing a request to be sent to the mobile device for the mobile device to send updated user interest data in about real time.

7. The server of claim 1, further comprising:

determining that the user is at a location other than a location corresponding to the gaming operator; and causing requests to be sent to the mobile device for the mobile device to periodically send updated user interest data that corresponds to a time interval.

8. The server of claim 1, wherein the user interest data comprises a key word list that comprises weighting of the key words based on usage by the user.

9. The server of claim 1, wherein the targeted offer message invites the user to play the EGM.

10. The server of claim 1, wherein the gaming opportunity comprises an electronic gaming machine (EGM) that comprises content that corresponds to a portion of the user interest data, and wherein the targeted offer message comprises an offer to provide game incentives to the user that correspond to the EGM.

11. The server of claim 1, wherein the gaming opportunity comprises an entertainment experience at a casino operated by the gaming operator, and wherein the targeted offer message comprises an offer to provide a discount corresponding to the entertainment experience.

12. The server of claim 1, wherein the gaming opportunity comprises an electronic gaming machine (EGM) that comprises content that corresponds to a portion of the user interest data, and wherein the targeted offer message comprises a video graphic that corresponds to an attract mode of the EGM.

13. The server of claim 1, further comprising:

aggregating the user interest data that corresponds to a plurality of users to generate aggregate user interest data, providing the aggregate user interest data to the gaming operator for future gaming opportunities identification.

14. A method comprising:

receiving, into a data repository corresponding to a mobile device of a user, input data that is received via a plurality of non-gaming software applications operating on the mobile device wherein a first one of the plurality of non-gaming software applications comprises a sports related application;

storing elements of the input data as identifiers corresponding to user non-gaming interests;

sending, to a gaming operator device, user interest data corresponding to the elements of the input data; and receiving a targeted offer message that corresponds to a gaming opportunity that relates to the user interest data, wherein the gaming opportunity comprises an electronic gaming machine (EGM) that comprises content that corresponds to a portion of the user interest data, wherein the targeted offer message comprises a video graphic that corresponds to an attract mode of the EGM, wherein the gaming opportunity comprises an entertainment experience at a casino operated by the gaming operator, and wherein the targeted offer message comprises an offer to provide a discount corresponding to the entertainment experience.

15. The method of claim 14, further comprising receiving a request for the user interest data from a gaming operator device, wherein sending the user interest data to the gaming operator device is performed responsive to receiving the request.

16. A device comprising:

processor circuit; and a memory coupled to the processor circuit, wherein the memory comprises computer program instructions that, when executed by the processor circuit, cause the server to perform operations comprising:

receiving, from a user, user inputs corresponding to a plurality of non-gaming software applications that operate on the device and that correspond to user-specific interests of the user wherein a first one of the plurality of non-gaming software applications comprises a social media software application;

comparing the user interest data to a gaming opportunity that is provided by a gaming operator that operates a plurality of gaming devices; and responsive to determining that an element of the user interest data corresponds to the gaming opportunity, causing a targeted offer message that corresponds to the gaming opportunity to be sent to the user, wherein the gaming opportunity comprises an entertainment experience at a casino operated by the gaming operator, and wherein the targeted offer message comprises an offer to provide a discount corresponding to the entertainment experience.

17. The device of claim 16, wherein the gaming opportunity comprises an electronic gaming machine (EGM) that comprises content that corresponds to the element of the user interest data, and wherein the targeted offer message comprises an offer to provide game incentives to the user that correspond to the EGM.

* * * * *